W. G. R. BRAEMER.
SPRAYING APPARATUS.
APPLICATION FILED FEB. 11, 1910.
963,354.
Patented July 5, 1910.
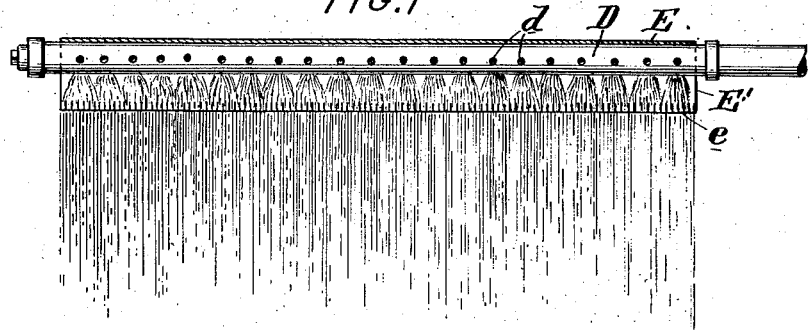
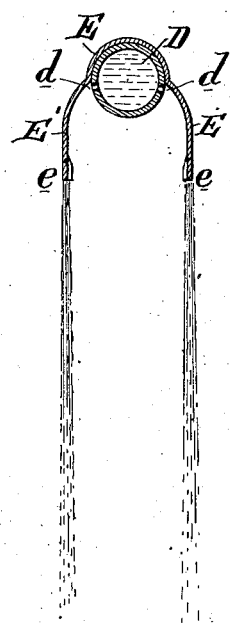
WITNESSES
INVENTOR
William G. R. Braemer
BY
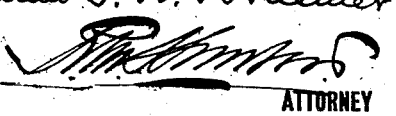
ATTORNEY

UNITED STATES PATENT OFFICE.

WILLIAM G. R. BRAEMER, OF CAMDEN, NEW JERSEY, ASSIGNOR TO WARREN WEBSTER & COMPANY, A CORPORATION OF NEW JERSEY.

SPRAYING APPARATUS.

963,354.        Specification of Letters Patent.        Patented July 5, 1910.

Original application filed January 7, 1908, Serial No. 409,638. Divided and this application filed February 11, 1910. Serial No. 543,226.

*To all whom it may concern:*

Be it known that I, WILLIAM G. R. BRAEMER, a citizen of the United States, and resident of the city of Camden, county of Camden, and State of New Jersey, have invented an Improvement in Spraying Apparatus, of which the following is a specification.

My invention has reference to spraying apparatus and consists of certain improvements which are fully set forth in the following specification and shown in the accompanying drawings which form a part thereof.

This application is a division of my application Serial Number 409,638 filed January 7, 1908, and has for its object the provision of spraying apparatus which may be employed for producing sheets of water such as suitable for use in purifying apparatus for air or other purposes wherein liquid spray in sheet-like form is required.

My invention consists of a pipe for liquid having apertures upon one or both sides, and from which the liquid is caused to flow, combined with a hood of sheet metal extending over the pipe and having its lower parts arranged to coöperate with the pipe so as to constitute one or more aprons against which the fluid is projected and from the lower edges of which it falls in spray.

My invention also comprehends details of construction, which, together with the features above specified will be better understood by reference to the drawings, in which:—

Figure 1 is a side elevation of the spray pipe with the hood in section, embodying my invention; and Fig. 2 is a cross section of the same.

D is the spray pipe into one end of which the water is delivered, and is provided with a series of oppositely directed apertures $d$ preferably slightly below the horizontal diameter, as indicated in Fig. 2. Arranged over this pipe is a spraying shield or hood E which may have irregular or corrugated shaped lower edges $e$ to subdivide the water or other liquid. As shown in Fig. 2, the hood or shield E is semi-cylindrical at the top so as to snugly fit upon the pipe D and said shield extends outwardly from the pipe immediately above the apertures $d$, and thence curves downward and terminates in the free edges adjacent to the letter $e$, and said edges may, if desired, be provided with corrugations. The apertures may be made in any suitable form.

In the operation of my improved spraying device the liquid which is forced into the pipe D is projected through the apertures $d$, at each side and impinges upon the under surfaces of the aprons E' of the shield or hood E and by which the fluid is spread, so that the successive portions of the fluid projected along the length of the pipe D spread laterally upon the said apron portions of the shield or hood to practically meet and thereby form a thin layer of fluid which falls from the lower edges in the form of spray. As these lower edges $e$ of the aprons are substantially parallel to the length of the pipe, it is evident that the spray will be substantially in the form of a sheet.

While I prefer, in practice, to employ two sets of the apertures $d$ in the spray pipe and two aprons E' for the hood or shield E, it is evident that only one of such sets of apertures and aprons may be employed for the spraying pipes. It is also evident that the corrugations $e$ may be omitted if so desired. It will be further understood that while I have shown the shield or hood as fitting snugly upon the top of the spray pipe D as a convenient and compact mode of construction, any other manner of associating the parts may be employed so long as the spraying apertures $d$ and the aprons E' are arranged to coact in the manner above described.

The spray pipes D, while preferably made of ordinary iron pipe with holes drilled along its sides, may be made in any other manner so long as it acts as a conduit for the water or other fluid under pressure and provides lateral openings from one or both sides through which the water or other fluid may be projected upon the aprons of the hood or shield. I prefer to make the shield of sheet metal, but it may be of cast metal or other material if so desired.

Having now described my invention, what I claim as new and desire to secure by Letters Patent, is:

1. Spraying apparatus which consists of a pipe having lateral apertures, combined with an inclosing hood having downwardly extending aprons against which the jets of fluid from the apertures in the pipe impinge, said aprons terminating in lower edges from which the water falls in a thin spray sheet.

2. Spraying apparatus which consists of a pipe having lateral apertures, combined with an inclosing hood having downwardly extending aprons against which the jets of fluid from the apertures in the pipe impinge, said aprons terminating in lower corrugated edges from which the water falls in a thin spray sheet.

3. In a spraying apparatus, a pipe having a series of side apertures through which the fluid to be spread is forced, combined with a downwardly extending plate surface constituting an apron against which the fluid from the apertures is made to impinge and spread out into a thin film, whereby the fluid is caused to drop from the lower edge of the plate apron in a thin spray sheet.

4. In a spraying apparatus, a pipe having a series of side apertures through which the fluid to be spread is forced, combined with a downwardly extending plate surface constituting an apron the lower edge of which is corrugated and against which apron the fluid from the apertures is made to impinge and spread out into a thin film, whereby the fluid is caused to drop from the lower corrugated edge of the plate apron in a thin spray sheet.

5. A spraying device comprising a longitudinal pipe having means for causing the water to be projected laterally therefrom, combined with an apron arranged parallel to the length of the pipe and upon which the water is made to impinge, the lower edge of said apron terminating at a distance from the pipe and forming a line of discharge for the film of water whereby it is caused to be spread and sprayed in sheet-like form.

6. In spraying apparatus, a horizontal spray pipe having a series of apertures on each side combined with two downwardly extending aprons arranged upon opposite sides of the pipe in the line of its apertures and upon which the fluid from the pipe is projected and spread into thin films, said aprons having free lower edges from which the fluid film is projected in the form of sheets of spray.

In testimony of which invention, I hereunto set my hand.

WM. G. R. BRAEMER.

Witnesses:
 GEO. S. WESTERFIELD,
 A. J. WESTERFIELD.